United States Patent [19]
Papalexis et al.

[11] 3,927,611
[45] Dec. 23, 1975

[54] DOUGH DEGASSER AND DEVELOPER

[76] Inventors: Gregory C. Papalexis, Cambridge Way, Alpine, N.J. 07620; Richard I. Elliott, 103 Penfield Ave., Croton On Hudson, N.Y. 10520

[22] Filed: Feb. 15, 1973

[21] Appl. No.: 332,683

[52] U.S. Cl................................ 99/472; 425/203
[51] Int. Cl.² .................... A21C 3/00; A21C 11/00; A23G 1/22; A23G 3/00
[58] Field of Search ...... 99/472; 425/203, 205, 208, 425/206

[56] References Cited
UNITED STATES PATENTS

| | | | |
|---|---|---|---|
| 2,868,144 | 1/1959 | Ambrette | 425/203 X |
| 3,216,375 | 11/1965 | Ernst | 425/203 |
| 3,225,715 | 12/1965 | Page | 425/203 X |
| 3,502,041 | 3/1970 | Lotz | 425/203 X |

*Primary Examiner*—Leonard D. Christian

[57] ABSTRACT

Dough processing control system comprising a hopper and control unit for controlling degassing and developing of yeast raised dough while feeding dough to scaler. Dough deflectors on one side of hopper prevents congestion and promotes smooth dough flow. Control unit comprises a degassing chamber and developing chamber. Dough enters degassing chamber through a wedge shaped entry point and is compressed and propelled by a variable pitch screw element. Simultaneously excess gas is removed through a main port from a vacuum chamber formed by a rotating disk shield having circumferential vacuum slots. Dough is finely mixed in a developing chamber by a paddle wheel-like element having curved blades. Said developing chamber also having breakers for breaking up the dough into smaller uniform dough modules thereby developing a uniform testure in the dough mass.

9 Claims, 5 Drawing Figures

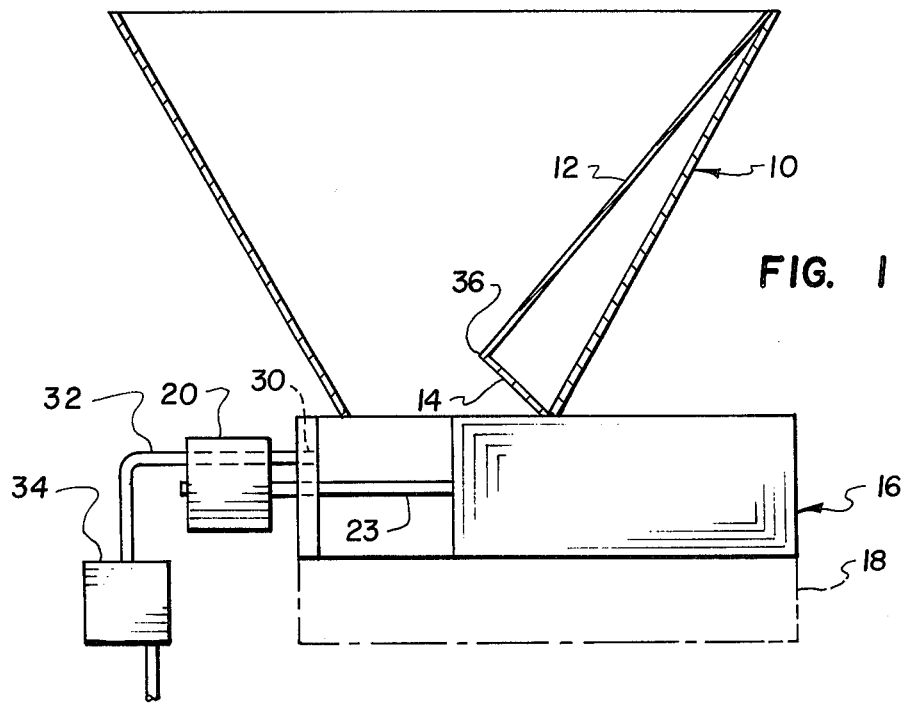
FIG. 1
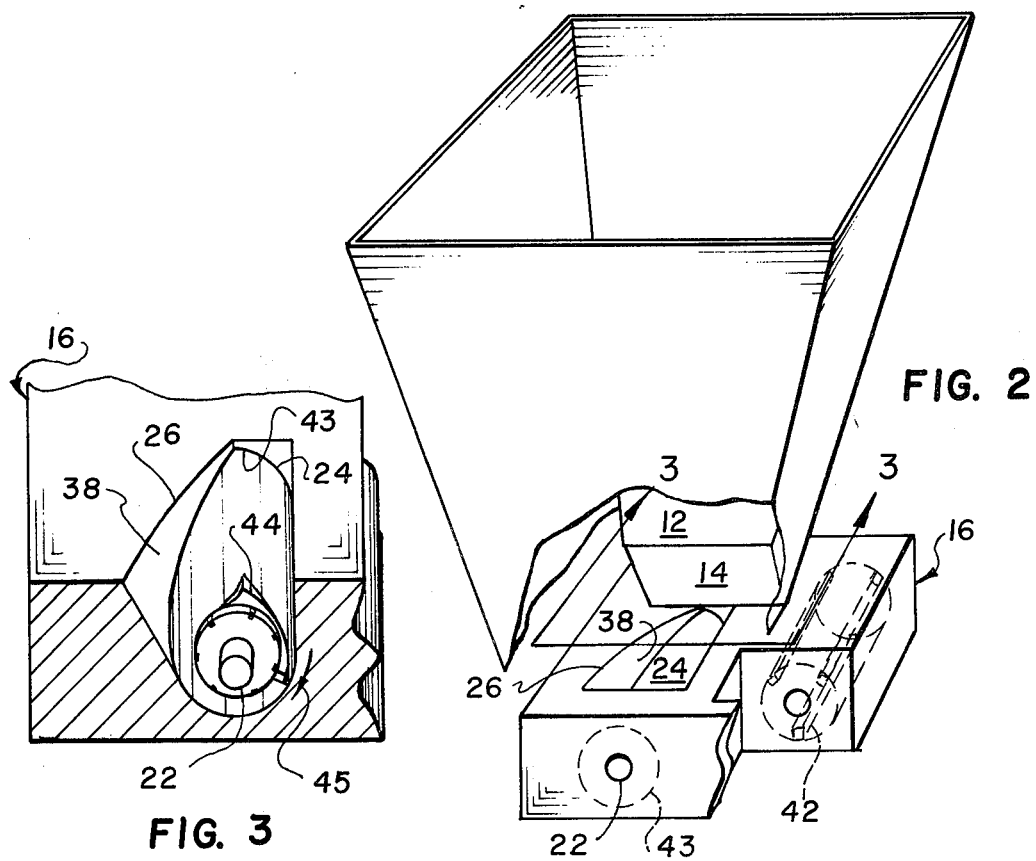
FIG. 2
FIG. 3

DOUGH DEGASSER AND DEVELOPER

BACKGROUND OF THE INVENTION

1. Field of the Invention

In general, the present invention is related to dough processing equipment. More particularly, this invention is concerned with a dough degassing and developing device with rapid feed action.

2. Description of Prior Art

Heretofore, conventional dough developers and hoppers operated at a relatively slow rate which allowed large gas bubbles to form within the yeast raised dough which affected the texture, density, and taste of the baked product. In addition, the production rate of the subsequent dough scaling operation had to be slowed down in order to synchronize it with the dough developer.

The present invention solves these problems to a large extent by providing anti-congestant means for rapid dough flow, fast removal of excess gas from the dough by dough compression and vacuum suction means, and rapid mixing means to develop dough into a fine consistency prior to the scaling operation.

SUMMARY

The present invention contemplates a dough feeder control system for rapidly degassing and developing yeast raised dough prior to scaling. The invention provides rapid dough flow by means of dough deflectors attached to the dough feeding hopper and a wedge-shaped entry port on a degassing chamber; a variable pitch element in the degassing chamber in conjunction with a vacuum port and rotating shield which drives out excess gas from the dough; and a paddle wheel mixer having curved blades in conjunction with dough breaking elements rapidly mixes the dough to a fine consistency before entering the scaling or cutting operation.

Therefore, one object of this invention is to increase the speed of degassing and developing in order to synchronize these operations with a higher scaling rate.

Another object of this invention is to eliminate large gas bubbles in the dough and improve the texture of the baked product.

A further object of this invention is to improve the tolerances on size and density of the baked product for better quality control.

Another object of this invention is to provide a finer dough consistency and therefore improve the flavor of the baked product.

Another object of this invention is to promote rapid dough flow in order to minimize gas generation in the dough prior to scaling.

Another object of this invention is to produce dough with a higher density and uniformity in order to improve production efficiency during the scaling, cutting, conveying, and forming operations.

Still another object of this invention is to minimize production interruptions and adjustments prior to scaling by eliminating conjestion of dough flow.

These and other objects and features of the invention are pointed out in the following descriptions in terms of the embodiments thereof which are shown in the accompanying drawings. It is to be understood, however that the drawings are for the purpose of illustration only and are not a definition of the limits of the invention.

BRIEF DESCRIPTION OF THE DRAWINGS

FIG. 1 is a side elevational view partially in section, showing the hopper with deflectors, the control unit, power drivers vacuum trap, and a fragmented section of a scaler.

FIG. 2 is a perspective view of the hopper and control unit partially broken away to show detail, showing the wedge-like deflectors of the hopper and shape of the entry port of degassing chamber and relationship of developing chamber to degassing chamber; with screw element and paddle wheel element not shown in order to clarify surrounding structure.

FIG. 3 is a fragmentary sectional view of the entry port taken from line 3—3 of FIG. 2 illustrating the bevelled edge of one side of the entry port and relative direction of rotation of the screw element in the degassing chamber.

DESCRIPTION OF THE PREFERRED EMBODIMENT OF THE INVENTION

Figure 4:
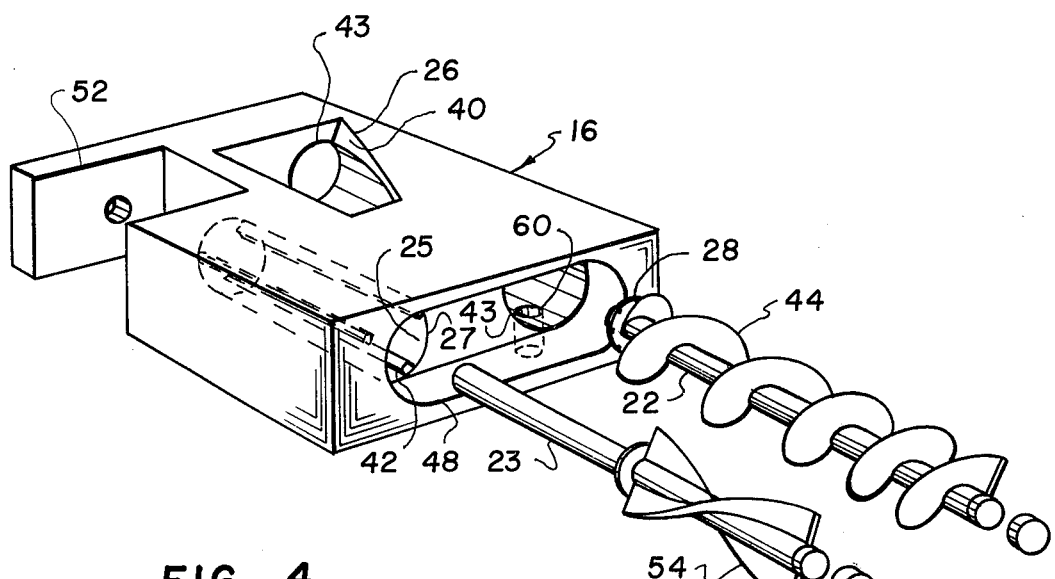
FIG. 4 is an exploded perspective view of the control unit illustrating the relative positions of the entry port, degassing chamber, screw element, developer chamber, paddle wheel element, and connecting chamber.

In the mass production of certain baked products, such as hamburger rolls, frankfurter rolls, breads, and cakes where yeast raised dough is employed, many steps and processes are required to yield a high quality product. Specifically, the present invention is concerned with machinery for processing raw dough before it is fed into a scaler where it is cut into a predetermined size.

Referring to FIGS. 1, 2 and 3 the dough feeder system is basically comprised of a hopper 10 feeding a control unit 16 which in turn feeds a conventional scaler 18, shown in phantom. A batch of raw dough is first placed into hopper 10 which must rapidly feed an entry port 26, shown in FIG. 2 and 3, of the control unit 16. In order to prevent dough turbulence and conjestion at the entry port 26 a bottom deflector plate 14 is positioned at an acute angle above the entry port 26 for smooth and rapid dough flow. A top deflector plate 12 connected to the bottom deflector plate 14 at 36, additionally, provides a smooth dough flow into the region above the entry port 26. Although a four sided hopper is shown, other shapes may be utilized, provided that deflector plates 12 and 14 are incorporated into the structure.

Figure 5:
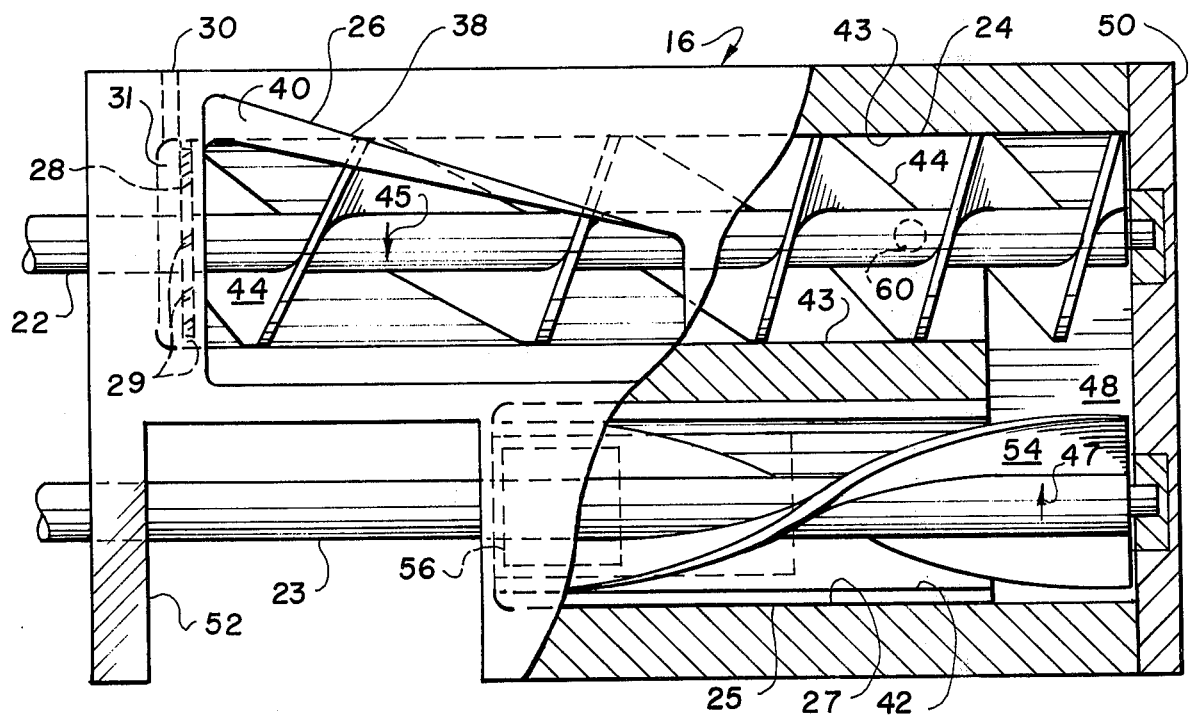
FIG. 5 is a top plan view of the control unit partially in section, showing the screw element in the degassing chamber and the paddle wheel element in the developing chamber.

The control unit 16, more clearly shown in FIGS. 4 and 5, is basically comprised of the entry port 26, a degassing chamber 24, a vacuum port 30, a developing chamber 25, and an exit port 56. The cutaway section of FIG. 2 shows the entrance end of the degassing chamber 24.

In order to promote rapid dough flow into the degassing chamber 24 without conjestion, the quadrilateral outline of the entry port 26 has one non-orthogonal side 38 forming a wedge-like shape pointing towards the exit end of the degassing chamber 24. The non-orthogonal side 38, in addition, has a downwardly bevelled edge 40 with progressively decreasing depth of cut as the narrow end of the wedge is approached. In this manner rapid dough flow into the entry port 26 will not cause turbulence with its associated air pockets. In addition, rapid dough flow minimizes the generation of gas within the dough prior to scaling.

The degassing chamber itself 24 is comprised of a horizontal cylindrical bore 43 having a screw-shaped element 44 rotatably mounted within the cylindrical bore on shaft 22. In FIG. 5 the relationship of the screw element 44 to the entry port 26 can be seen more clearly. The bevelled edge 40 reaches a maximum vertical depth equal to approximately the radius of the screw element 44. The screw element itself 44 rotates in a closcwise direction, as shown by arrow 45 in FIG. 3, when viewed from the entrance end of the degassing chamber 24.

In order to compress the dough gradually as it enters the degassing chamber the pitch of the screw threads diminishes as the exit end of the degassing chamber 24 is approached. The screw threads 44 with its diminishing pitch can be seen more clearly in FIG. 5. In this manner excess gas is squeezed out of the raw dough. As shown in FIG. 1, the gas is removed by means of the vacuum port 30 through a vacuum line 32 to a vacuum trap 34 which retains small bits of dough than may enter the vacuum line 32.

During the degassing operation the dough is prevented from going into a vacuum chamber 31 by means of a rotating disk shield 28 integrally attached to shaft 22. The disk shield 28 having a diameter slightly less than the diameter of the cylindrical degassing chamber 24 and small vacuum slots 29 formed in the circumference of the disk shield 28, as shown in FIG. 5. In this manner the rotating action of the disk shield 28 in conjunction with the relatively high viscosity of the dough permits the gas to be effectively withdrawn through the slots 29 leaving the dough intact.

The degassing dough is then propelled into the developing chamber 25 via the interconnected chamber 48 having a removable plate 50 for cleaning accessability.

In addition, as shown in FIG. 4, there is an aperture 60 interconnecting the degassing chamber 24 and the scaler 18. This permits venting to the atmosphere, through the scaler, of any additional gas, that was not withdrawn through the vacuum port 30.

The developing chamber 25 is comprised of a horizontal cylindrical bore 27 which is parallel with the degassing chamber 24, a plurality of rail-like dough breakers 42 connected to the surface of the cylindrical bore 27, and a paddle wheel element 54 having a plurality of curved blades integrally attached to shaft 23. The dough breakers 42 break up the dough into smaller uniform dough modules while the paddle wheel 54, which rotates in a direction opposite to the direction of the screw element 44, as shown by arrow 47 homogeneously mises and develops the dough into a fine consistancy. The pressure which is produced by the screw element 44 propels the dough through the exit port 56 and into the scaler 18 below. For cleaning and accessibility an open section 52 of the control unit 16 is provided.

Two power drivers 20, shown schematically in FIG. 1, rotated shafts 22 and 23 in opposite directions and at variable speeds depending upon scaler synchronizing rates, dough temperature, and dough viscosity.

It should be noted that the hopper 10 and control unit 16 preferably should be constructed of durable non-corrodible material.

While the present invention has been described in preferred embodiments, it will be obvious to those skilled in the art that various modifications can be made therein within the scope of the invention.

What is claimed is:

1. An integrate dough degasser and developer control system for automatic processing of yeast raised dough comprising in combination a hopper having an upper section and a narrow bottom end, and at least three sides: an anti-wedge for rapid dough flow integrally connected to one of said sides and within the inner surface of said hopper for receiving dough by gravity action;

a dough degassing and developing control unit having a top surface connected to the narrow end of said hopper for removing excess gas from yeast raised dough and homogeneously mixing said dough prior to further processing;

wherein said control unit further comprises:
      a bottom surface;
      an entry port located on said top surface and in juxtaposition to the narrow end of said hopper for receiving said dough, and an exit port located on said bottom surface;
      a first chamber having entrance and exit ends, said entrance end connected to said entry port for degassing and compressing said dough;
      a second chamber having entrance and exit ends, said entrance of said second chamber connected to the exit end of said first chamber, said exit end of said second chamber connected to the exit port on bottom surface of said control unit; and,
      a vacuum port located at entrance of said first chamber for removing excess gas from said dough and sucking dough into said entry port for rapid dough flow.

2. The apparatus according to claim 1 wherein said anti-congestant wedge comprises:

an upper deflector plate having its upper end attached to the upper section of said hopper side; and a lower deflector plate with smaller surface area than said upper deflector plate, said lower deflector plate having its lower end attached to the bottom end of said hopper, the upper end of lower deflector plate connected to lower end of said upper deflector plate so that a wedge shaped section is formed with an apex forming a wedge located above a central portion of said entry port whereby said upper deflector plate promotes a downwardly smooth flow of dough and said lower deflector plate prevents congestion and turbulence by deflecting dough into said entry port so that rapid dough flow is maintained into said control unit.

3. An integrate dough degasser and developer control system for automatic processing of yeast raised dough comprising in combination:

a hopper having an upper section and a narrow bottom end, and at least three sides: an anti-wedge for rapid dough flow integrally connected to one of said sides and within the inner surface of said hopper for receiving dough by gravity action;

a dough degassing and developing control unit having a top surface connected to the narrow end of said hopper for removing excess gas from yeast raised dough and homogeneously mixing said dough prior to further processing;

wherein said control unit further comprises:
      a bottom surface;
      an entry port located on said top surface and in juxtaposition to the narrow end of said hopper for receiving said dough, and an exit port located on said bottom surface;

a first chamber having entrance and exit ends, said entrance end connected to said entry port for degassing and compressing said dough;

a second chamber having entrance and exit ends, said entrance of said second chamber connected to the exit end of said first chamber, said exit end of said second chamber connected to the exit port on bottom surface of said control unit;

a vacuum port located at entrance of said first chamber for removing excess gas from said dough and sucking dough into said entry port for rapid dough flow;

and further wherein said entry port is structurally comprised of:

a quadrilateral aperture having a nonorthogonal side forming a wedge shape with narrow end of said wedge pointing toward exit end of said first chamber and located directly below said lower deflector plate of said hopper said non-orthogonal side of entry part having a downwardly bevelled top edge with progressively decreasing depth of cut when approaching narrow end of entry port in order to promote rapid smooth flow of dough into said first chamber and minimize dough turbulence.

4. The apparatus according to claim 3 and furthermore wherein said first chamber comprises:

a cylindrical bore in a horizontal direction in said control unit directly below said entry port;

a screw shaped element rotatably mounted within said cylindrical bore so that entrapped gas bubbles in dough is broken up for efficient degassing action while the dough is propelled into said second chamber for further processing;

a vacuum means connected to said first chamber through said vacuum port; and, a rotating disk shield mechanically connected to said screw shaped element at the entrance end of said first chamber and pneumatically connected in juxtaposition to said vacuum port to form a gap operably permitting gas to be sucked out by said vacuum line while forming a shield to prevent dough from going into the vacuum chamber and into said vacuum port.

5. The combination as defined in claim 4 wherein said screwshaped element is comprised of:

a shank extending along longitudinal axis of said cylindrical bore; and helical threads integrally attached to said shank, said threads having decreasing pitch towards exit end of said first chamber so that dough is gradually compressed in order to release excess gas bubbles in the dough during the degassing operation.

6. The apparatus according to claim 4 further comprising a vacuum chamber and wherein said disk shield comprises a solid disk integrally attached to said shank of screw shaped element, and having circumferential slots through which gas is drawn to said vacuum chamber.

7. The apparatus according to claim 1 and furthermore wherein said second chamber comprises:

a cylindrical bore in a horizontal direction in said control unit;

dough breaking means attached to surface of said cylindrical bore; and, a paddle wheel-shaped element rotatably mounted within said cylindrical bore so that dough is evenly mixed and developed prior to further processing.

8. The apparatus according to claim 7 wherein said dough breaking means comprises a plurality of rail-like projections connected to surface of said cylindrical bore in parallel direction to longitudinal axis of said cylindrical bore so that dough nodules are broken up by said paddle wheel element during said developing operation.

9. The apparatus according to claim 7 wherein said paddle wheel element comprises:

a shaft extending along the longitudinal axis of said cylindrical bore; and a plurality of curved blades attached to said shaft so that dough is evenly mixed into a fine consistency during the developing operation and propelled into the exit port.

* * * * *